United States Patent [19]
Stoll et al.

[11] 3,895,648
[45] July 22, 1975

[54] VALVES

[76] Inventors: Kurt Stoll, Lenzhalde, Esslingen a.N.; Gerhard Hihn, Schurwaldstr. 7, Berkheim, both of Germany

[22] Filed: Jan. 9, 1974

[21] Appl. No.: 431,854

[30] Foreign Application Priority Data
Jan. 17, 1973 Germany............................ 7301612

[52] U.S. Cl................................ 137/550; 137/102
[51] Int. Cl.²......................................... F16K 15/02
[58] Field of Search ............ 137/102, 550, 625.27, 137/625.66, 625.67, 625.25

[56] References Cited
UNITED STATES PATENTS

| | | | |
|---|---|---|---|
| 1,412,473 | 4/1922 | Lane.................................. | 137/102 |
| 1,506,012 | 8/1924 | Lewis............................ | 137/102 UX |
| 2,517,061 | 8/1950 | Von Stackelberg ....... | 137/625.25 X |
| 2,567,391 | 9/1951 | Mead.................................. | 137/102 |
| 2,876,785 | 3/1959 | Huxley.............................. | 137/102 |
| 3,550,847 | 12/1970 | Scott.......................... | 137/625.66 X |
| 3,638,675 | 2/1972 | Dockery............................ | 137/550 |

*Primary Examiner*—Henry T. Klinksiek

[57] ABSTRACT

A quick-acting air relief valve is formed of a valve casing with a cylindrical chamber which has an inlet opening for connection to a pneumatic source, a vent opening for connection to atmosphere and a transverse bore ending in the chamber for connection to an air operated device. A valve member is displaceable inside the chamber and has on its underside an annular groove of curved cross-section which opens conically outwards. This forms a lip on the valve member which rests elastically against the inner wall surface of the cylinder. On the underside of the valve member is a valve sealing member which engages a collar-shaped connection which projects into the chamber around the vent opening. The vent opening is formed with a funnel-shaped, conical, widened section in the broadest part of which is arranged a filter of sound-absorbing material.

1 Claim, 1 Drawing Figure

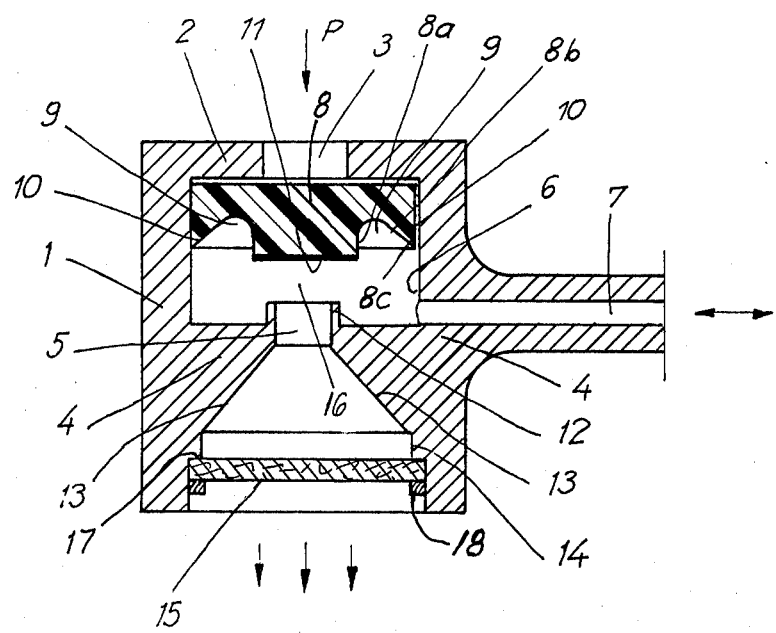

3,895,648

VALVES

BACKGROUND OF THE INVENTION

1. Field of the Invention

The invention relates to quick-acting air relief valves which are located in a casing with an inlet opening, an outlet opening, and a vent opening, the valve incorporating a loosely fitting valve plate which is displaceable inside the casing to close the vent opening or open the connection between the outlet opening and the vent opening dependant upon the position of the valve plate in the casing.

The PRIOR ART

Such quick-acting air relief valves are used in association with pneumatically operated devices. The valves are located between the operating device and a source of pressure, so that the pressure in the pipes on the side of the operating device can be quickly reduced when the plant is stopped. A drawback of such arrangements is that the noise produced by compressed air when it escapes through the valve and expands can reach a sound pressure level which is experienced as pain.

SUMMARY OF THE INVENTION

It is an object of the invention to reduce, by means of a quick-acting air-relief valve, the noise level of air escaping from pneumatically operated devices to a lower, bearable level.

According to the invention this is achieved by the aid of a sound damping filter, for example a disc made of a preferably porous, sound-absorbing material, which is associated with the vent opening and covers the cross-section of the total venting system, screening it against the outside.

BRIEF DESCRIPTION OF THE DRAWINGS

An embodiment of the invention is described below, by way of example only, with reference to the accompanying drawing which is a cross-section through an air relief valve according to the invention.

DESCRIPTION OF THE PREFERRED EMBODIMENT

The drawing shows a valve casing 1 of a quick-acting relief valve incorporating a cylindrical chamber 16 which includes, in a head zone 2, an inlet opening 3 to connect with a source of compressed air, and in the zone of the bottom 4 a passage or venting opening 5 which opens to atmosphere. A transverse bore 7 which ends at the valve bottom 4 extends from the cylindrcal part 6 of the valve chamber and leads to a fluid operated cylinder or other device (not illustrated) through pressure pipes which are likewise not illustrated.

A valve plate 8 is loosely fitted into the cylindrical valve chamber and is capable of moving freely upwards and downwards inside the chamber, thereby acting as a valve element. The valve plate 8 is a disc-shaped and resilient, consisting, for example, of rubber or a plastics material. An annular groove 9 in its lower surface, which is remote from the inlet opening 3, extends concentrically with the central axis and, being contained between a longitudinally extending annular surface 8a and an annular surface 8b which is inclined towards it, has a generally conical cross-section. The groove opens towards the bottom, that is to say from the plate surface which is not opposite the inlet opening, and provides, together with the cylindrical surface 8c of the plate circumference, a resilient, annular lip 10. When the valve plate 8 assumes its bottom position, a sealing member 11 on the underside of the valve plate 8, interacts with a collar-shaped connecting piece or valve seat 12 provided around the vent opening 5. The latter projects into the chamber through the bottom 4 of the casing 1.

When in its upper position, as shown in the drawing, the valve plate 8 closes the inlet opening 3 in the head 2 and opens the vent opening 5 in the bottom 4. Compressed air flowing into the chamber through the transverse bore 7 as it returns from the air operated device can therefore escape to atmosphere through the vent opening 5. In order to reduce the velocity of the stream of compressed air, and in order to enable the air to expand while still inside the valve casing, a larger cross-section is provided adjacent to the vent opening, the system widening into a funnel-shaped section 13 which is followed by a cylindrical section 14 where the filter 15 made of a porous, sound-absorbing material, is accommodated. The installation of the filter 15 in the area of the largest cross-section makes it possible to enlarge the active zone of the filter considerably which, together with the lower flow rate of the escaping compressed air, enables the noise normally accompanying the escaping air to be damped to a very large extent. The filter is releasably clamped between a shoulder 17 in the valve body and a snap-ring or circlip for ease of replacement.

When a pressure P is applied to the upper surface of the valve plate 8, the latter is made to move downwards until it reaches its bottom position in the cylindrical chamber of casing 1. In this position, the valve seat 12, interacting with the sealing member 11, forms a seal while compressed air is allowed to flow from the pressure source to the operating device by passing the elastically relaxing lips 10 of the valve plate 8 into the valve chamber and hence through the transverse bore 7 which connects with the operating device. When the source of compressed air is disconnected so that the pressure P which is applied at the inlet side drops below the pressure at the working side, the valve plate 8 is caused to return to its upper position in the casing 1, closing the inlet opening 3 and opening the vent opening 5, so that the compressed air admitted from the working device can escape to atmosphere through the discharge funnel 13 and the filter 15.

An additional advantage of the filter 15 is that neither dust nor moisture can penetrate into the quick-acting air-relief valve and cause damage to or destruction of the valve.

What we claim is:

1. A quick-acting air relief valve which incorporates a valve casing with a cylindrical chamber having an inlet opening for connection to a pneumatic source, a vent opening for connection to atmosphere, and a transverse bore which ends in the chamber for connection to an air-operated device, and which also contains a valve member which is displaceable inside the chamber and has in its underside, which is remote from the inlet opening, an annular groove of curved cross-section which opens conically outwards, providing the valve member with an annular lip which rests elastically against the inner wall surface of the cylinder, and, at the underside of the valve member, a valve sealing member, the casing having, projecting into the chamber around the vent opening, a collar-shaped connection which is engageable by the sealing member and serves as a valve seat surrounding the vent opening, a funnel-shaped, conical, widened section adjacent to and communicating with the vent opening and a filter of a porous, sound-absorbing material in the zone of the largest cross-section of the widened section.

* * * * *